(12) United States Patent
Kumar et al.

(10) Patent No.: US 10,417,453 B2
(45) Date of Patent: Sep. 17, 2019

(54) PREEMPTION OF A CONTAINER IN A SECURE COMPUTATION ENVIRONMENT

(71) Applicant: Cryptography Research, Inc., Sunnyvale, CA (US)

(72) Inventors: Ambuj Kumar, Sunnyvale, CA (US); William Craig Rawlings, Saratoga, CA (US); Ronald Perez, Piedmont, CA (US); Denis Alexandrovich Pochuev, San Francisco, CA (US); Michael Alexander Hamburg, San Francisco, CA (US); Paul Kocher, San Francisco, CA (US)

(73) Assignee: Cryptography Research, Inc., Sunnyvale, CA (US)

(*) Notice: Subject to any disclaimer, the term of this patent is extended or adjusted under 35 U.S.C. 154(b) by 242 days.

(21) Appl. No.: 15/372,307

(22) Filed: Dec. 7, 2016

(65) Prior Publication Data
US 2017/0169254 A1 Jun. 15, 2017

Related U.S. Application Data

(60) Provisional application No. 62/267,215, filed on Dec. 14, 2015.

(51) Int. Cl.
| | | |
|---|---|---|
| *G06F 9/4401* | (2018.01) | |
| *G06F 21/62* | (2013.01) | |
| *G06F 21/45* | (2013.01) | |
| *G06F 21/60* | (2013.01) | |
| *G06F 21/52* | (2013.01) | |

(52) U.S. Cl.
CPC ........ *G06F 21/6281* (2013.01); *G06F 9/4418* (2013.01); *G06F 21/45* (2013.01); *G06F 21/52* (2013.01); *G06F 21/602* (2013.01)

(58) Field of Classification Search
CPC ...... G06F 21/6281; G06F 21/52; G06F 21/45; G06F 21/602; G06F 9/4418
See application file for complete search history.

(56) References Cited

U.S. PATENT DOCUMENTS

| | | | |
|---|---|---|---|
| 5,598,391 A * | 1/1997 | Mukawa | ........... G11B 11/10595 369/53.37 |
| 5,937,187 A | 8/1999 | Kosche et al. | |
| 6,751,742 B1 * | 6/2004 | Duhault | ................ G06F 1/3203 713/300 |
| 7,162,666 B2 | 1/2007 | Bono | |
| 7,243,236 B1 | 7/2007 | Sibert | |
| 8,738,932 B2 | 5/2014 | Lee et al. | |
| 8,843,764 B2 | 9/2014 | Hussain | |

(Continued)

*Primary Examiner* — Matthew T Henning
(74) *Attorney, Agent, or Firm* — Lowenstein Sandler LLP

(57) ABSTRACT

A container corresponding to executable code may be received. The container may be executed in a secure computation environment by performing one or more operations specified by the executable code of the container. An instruction to terminate the executing of the container may be received from a high level operating system (HLOS) that is external to the secure computation environment. A determination may be made as to whether the container is associated with a preemption privilege and the executing of the container may be terminated after receiving the instruction from the HLOS based on the determination of whether the container is associated with the preemption privilege.

20 Claims, 7 Drawing Sheets

(56) References Cited

U.S. PATENT DOCUMENTS

| | | | |
|---|---|---|---|
| 8,966,464 B1* | 2/2015 | Christopher | G06F 11/0712 |
| | | | 717/166 |
| 9,665,711 B1* | 5/2017 | Jakobsson | G06F 21/554 |
| 10,055,578 B1* | 8/2018 | Marquardt | G06F 21/53 |
| 2003/0188217 A1* | 10/2003 | Spiegel | G06F 9/442 |
| | | | 714/4.1 |
| 2004/0040024 A1* | 2/2004 | Green | G06F 9/485 |
| | | | 718/100 |
| 2005/0125661 A1* | 6/2005 | Vaidyanathan | G06F 21/53 |
| | | | 713/166 |
| 2007/0234086 A1* | 10/2007 | Bernstein | G06F 9/4418 |
| | | | 713/310 |
| 2011/0022859 A1* | 1/2011 | More | G06F 1/3203 |
| | | | 713/300 |
| 2011/0191754 A1* | 8/2011 | Burugula | G06F 9/00 |
| | | | 717/139 |
| 2013/0086299 A1* | 4/2013 | Epstein | G06F 12/1475 |
| | | | 711/6 |
| 2016/0179606 A1* | 6/2016 | Perry | G06F 11/0715 |
| | | | 714/38.11 |

* cited by examiner

PREEMPTION OF A CONTAINER IN A SECURE COMPUTATION ENVIRONMENT

RELATED APPLICATION

This application claims the benefit under 35 U.S.C. § 119(e) of U.S. Provisional Application 62/267,215 filed on Dec. 14, 2015, which is hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
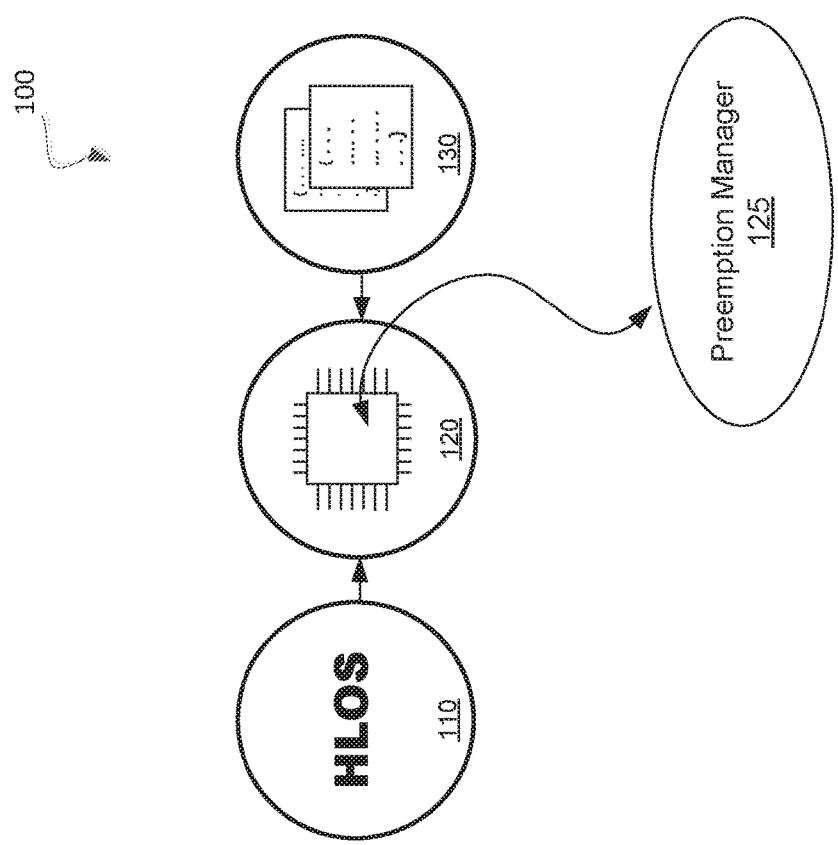
FIG. 1 illustrates an example secure computation environment with a preemption manager in accordance with some embodiments of the present disclosure.

Aspects of the present disclosure are directed to the preemption of a container in a secure computation environment. A device may include a system that is associated with a high level operating system (HLOS) and a secure computation environment that may be a subsystem of the system that is associated with the HLOS. Thus, the secure computation environment may be considered an embedded subsystem of the device. The HLOS may be used in association with components of the device that are external to the secure computation environment. For example, the HLOS may be an operating system that is used by the device. Furthermore, the HLOS may be considered an untrusted entity relative to the secure computation environment. The secure computation environment may control other resources or components that are within the secure computation environment.

The HLOS may schedule containers to be executed by the secure computation environment. A container may correspond to executable code. For example, the HLOS may provide a series of containers that are to be executed by the secure computation environment. The HLOS may schedule a first container to be executed by the secure computation environment and the resources or components of the secure computation environment may be accessed by the first container. The HLOS may further schedule a second container that is to be executed by the secure computation environment after the execution of the first container by the secure computation environment.

The secure computation environment may be associated with a timer, also referred to as a watchdog timer, that may terminate or end the execution of a container by the secure computation environment. For example, the first container may be executed by the secure computation environment for a period of time specified by the timer. Once the period of time has elapsed, the secure computation environment may no longer execute the container. Thus, the resources or the components of the secure computation environment may no longer be provided to the container after the period of time specified by the timer has elapsed. A subsequent container may then be executed by the secure computation environment.

The termination, also referred to as preemption, of a container after the period of time specified by the timer has elapsed may enhance the performance of the secure computation environment that is included in device. For example, if a container that is currently executed by the secure computation environment crashes or is associated with an error, the resources or components of the secure computation environment may continue to perform operations of the container that has crashed or is associated with the error. If the secure computation environment is configured to execute a threshold number of containers, then the execution of such a container may prevent the execution of a subsequent container that is to be executed by the secure computation environment.

A watchdog timer may be used by the secure computation environment to preempt or terminate a container. For example, each container that is executed by the secure computation environment may be allotted a particular period of time by the watchdog timer. After the period of time has elapsed (i.e., the watchdog timer has reached a value of zero), then the container may be preempted or terminated and the resources or components of the secure computation environment may perform operations of a subsequent container. In the same or alternative embodiments, the HLOS may provide an instruction to the secure computation environment to terminate or preempt a container that is currently being executed by the secure computation environment.

As previously mentioned, the HLOS may be external to the secure computation environment and may thus be considered to be an untrusted entity or less trusted, or privileged, to entities associated with the secure computation environment. For example, certain containers may be provided or signed with a cryptographic signature from a root entity that is recognizable by the secure computation environment. Such containers may include an identification that the containers are associated with a preemption privilege that assigns the watchdog timer with a higher start value for the particular container, are associated with a particular value that is to be added to a default watchdog timer start value specified for all containers, etc. A preemption privilege may thus correspond to a modification of the termination conditions for a particular container. Since these containers are signed with a cryptographic signature from a root entity that is recognizable to the secure computation environment, these containers may be considered to be trusted or more trusted or privileged relative to the HLOS. Such privileged or trusted containers may not be preempted or terminated based on an instruction from the HLOS.

For example, a first container may be received where the first container is not signed by a root entity that assigns a preemption privilege to the first container. During the execution of the first container by the secure computation environment, the HLOS may provide an instruction to preempt the first container. In response to the instruction, the secure computation may terminate the execution of the first container. Subsequently, a second container may be received where the second container is signed by a root entity that assigns a preemption privilege to the second container. During the execution of the second container, the HLOS may provide another instruction to preempt the second container while it is executed by the secure computation environment. Since the second container is assigned a preemption privilege by a root entity, the secure computation environment may continue to execute the second container based on the preemption privilege of the second container. As such, the instruction from the untrusted or unsecure HLOS may be overridden or ignored based on the preemption privilege of the second container that is considered to be secure or trusted based on the root entity signature.

In some embodiments, a type of operation performed by a container may further be used to prevent the preemption or termination of a container. For example, if the type of operation performed by a container is associated with a one-time programmable (OTP) memory write or other such operation that modifies a resource or component of the device or secure computation environment or leaves the secure computation environment in an undefined state (e.g., via the interruption of the performance of the operation), then the container may not be preempted or terminated until the particular operation has been completed by the secure computation environment.

Aspects of the present disclosure may address the above and other issues regarding the preemption or termination of a container in order to improve the performance of a secure computation environment that is embedded within a larger device. The preemption or termination of a container based on privileges assigned to the container by root entities may allow for trusted entities, or containers, additional processing time of the secure computation environment.

FIG. 1 illustrates an example environment 100 with a high level operating system (HLOS) 110, a preemption manager 125 of a secure computation environment 120, and one or more containers 130. In general, the environment 100 may correspond to a system or a device that operates an HLOS that schedules one or more containers for a secure computation environment operating within the system or the device.

As shown in FIG. 1, the environment 100 may include an HLOS 110 that is used by a system or device that is represented by the environment 100. The HLOS 110 may be external to the secure computation environment 120 that includes the preemption manager 125. In some embodiments, the HLOS 110 may schedule one or more containers 130 for execution by the secure computation environment 120. For example, the HLOS 110 may schedule or provide a first container to be executed by the secure computation environment 120 and a second container that is to be executed by the secure computation environment 120 after the execution of the first container. Further details with regard to the secure computation environment are described in conjunction with FIG. 2.

The secure computation environment 120 may include a preemption manager 125 that may control the preemption or termination of the one or more containers 130 that are executed by the secure computation environment 120. The HLOS 110 may provide an instruction to the secure computation environment 120 to terminate or preempt a container from the one or more containers 130. The preemption or termination of the container may be based on characteristics of the container. For example, if the container is associated with a preemption privilege assigned by a root entity that is recognized by the secure computation environment 120 and/or if the container includes an operation that is executing to modify a state of the secure computation environment 120 or a system that includes the secure computation environment 120 (e.g., writing to an OTP memory), then the instruction to preempt or terminate the container from the HLOS 110 may be ignored. Further details with regard to the preempting or terminating of a container are described in conjunction with FIGS. 3-6.

Thus, a device or a system may include a high level operating system (HLOS) and a subsystem that corresponds to the secure computation environment. The HLOS may schedule containers or arrange an order of execution for containers by the secure computation environment. The HLOS may further be allowed to preempt or terminate a container based on characteristics of the containers.

Figure 2:
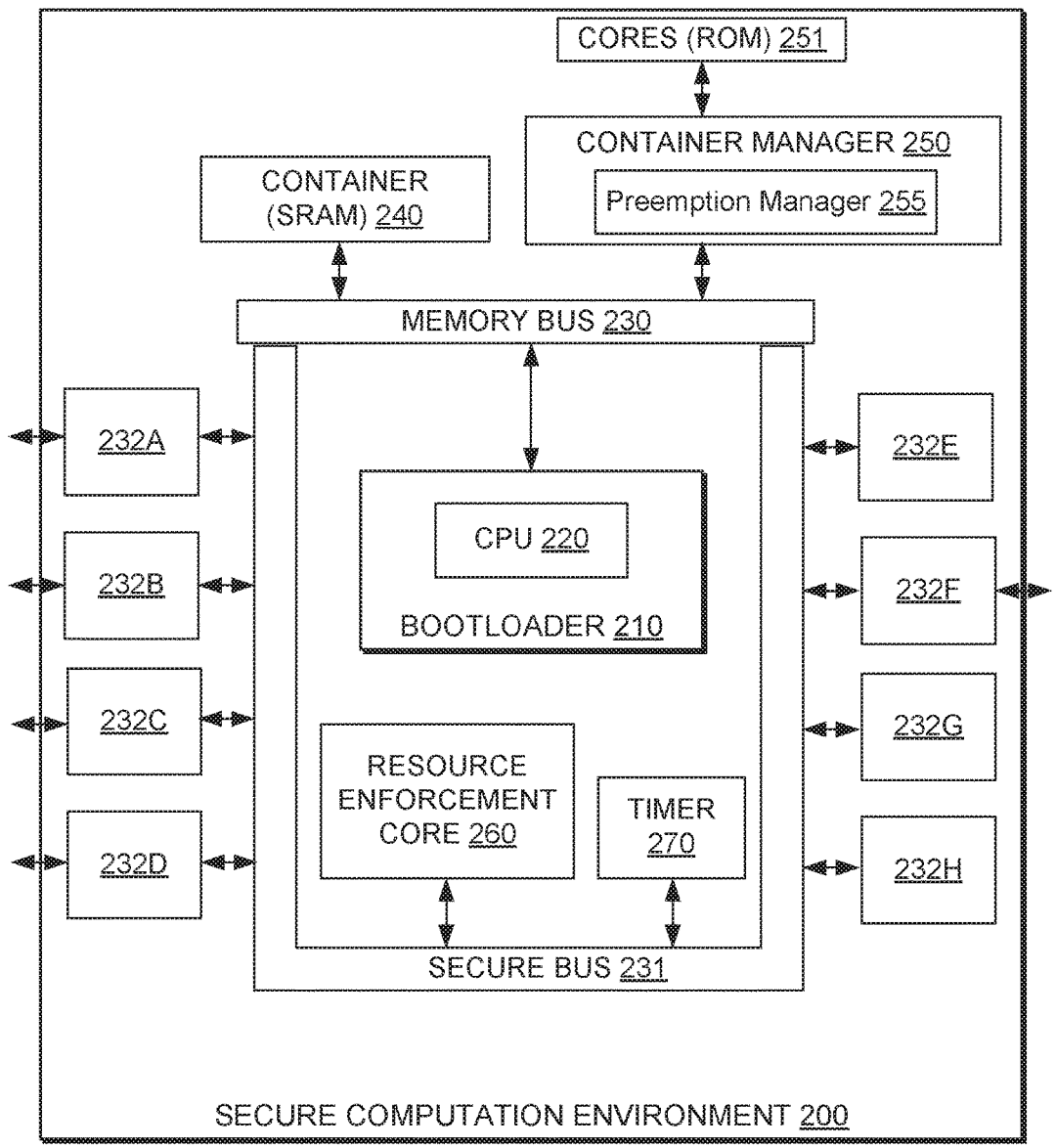
FIG. 2 illustrates an example architecture of a secure computation environment that includes a preemption manager in accordance with some embodiments.

FIG. 2 illustrates an example architecture 200 of a secure computation environment. In general, the architecture 200 may include a container manager 250 that includes a preemption manager 255 that corresponds to the preemption manager 125 of FIG. 1 and a container 240 that corresponds to one of the containers 130 of FIG. 1.

As shown in FIG. 2, the architecture 200 may include a bootloader 210 that controls a CPU 220 or other such processing device, a container manager 250 that is stored in ROM or other such memory, and a container 240 that is stored in static random access memory (SRAM) or other such memory. A memory bus 230 may couple the container 240 and the container manager 250 with the bootloader 210 and other resources 232A-H of the architecture 200.

The architecture 200 may include a resource enforcement core 260 that enforces control or access to the resources 232A-H of the architecture 200. Such resources may include, but are not limited to, one-time programmable (OTP) memory writes or burns, OTP reads, feature reads, feature writes, reading of cryptographic keys, updating of cryptographic keys, general purpose input/output (GPIO) reads, GPIO writes, an ability to execute code or instructions via or on the CPU 220, access to an executable region of the SRAM, read access to a particular portion of any such memory, write access to a particular portion of such memory, etc. The accesses may be fine grained. For example, the resource enforcement core may allow write access to one byte of the OTP but not to the next byte. Other resources may include access to functionality of cores 251 that are stored in ROM. Such cores 251 may correspond to elliptic curve cryptography (ECC) key generation, ECC signature verification, ECC signature generation, cryptographic key exchange, RSA key generation, RSA encryption or decryption, Advanced Encryption Standard (AES) encryption or decryption, SHA-2 or SHA-3 functionalities etc. In some embodiments, the resource enforcement core 260 may be programmed by the container manager 250 before the execution of each container 240. For example, a container 240 may include an identification of permissions to the features or resources 232A-H and the container manager 250 may program registers or memory of the resource enforcement core 260 based on the permissions of a container 240 that is to be executed. Thus, the resource enforcement core 260 may enforce access to the resources 232A-H via a secure bus 231 for containers 240 that have been verified by the container manager 250. In some embodiments, one or more of the resources 232A-H may be coupled to external components of a device that includes the architecture 200. For example, a resource 232B may be coupled to another system on a chip (SoC), OTP memory, an HLOS that corresponds to the HLOS 110 of FIG. 1, a random number generator component, or other such components that are external to the secure computation environment. In some embodiments, the resource 232B may be an HLOS register that receives data (e.g., a preemption instruction) from an HLOS and is read or accessed by the CPU 220 of the secure computation environment 200.

As shown in FIG. 2, the secure computation environment 200 may receive a container 240. The container manager 250 may provide a framework for the execution of containers. Each container may correspond to executable code or operations and privileges or permissions to access certain components or resources of the secure computation environment 200. The container manager 250 may receive and execute the containers in series so that the resources or components of the secure computation environment 200 are shared, or timeshared, by the containers. For example, the CPU 220 may be used to execute a first container until the first container is terminated or preempted. In some embodiments, the first container may be terminated or preempted by the preemption manager 255 based on a watchdog timer 270 as described in further detail below. After the termination or preemption of the first container, a second container may be received by the secure computation environment 200 and the CPU 220 may be used to execute the second container. Thus, the hardware resources or components of the secure computation environment 200 may be used to execute a container and may no longer be used to execute the container after a termination or preemption of the container.

In some embodiments, the secure computation environment 200 may execute the containers in a series. For example, a single container may be executed at one time by the secure computation environment 200. In alternative embodiments, the secure computation environment 200 may be configured to execute multiple containers at a single time. Thus, the hardware resources or components of the secure computation environment 200 may be shared or used by the currently executed containers.

Figure 3:
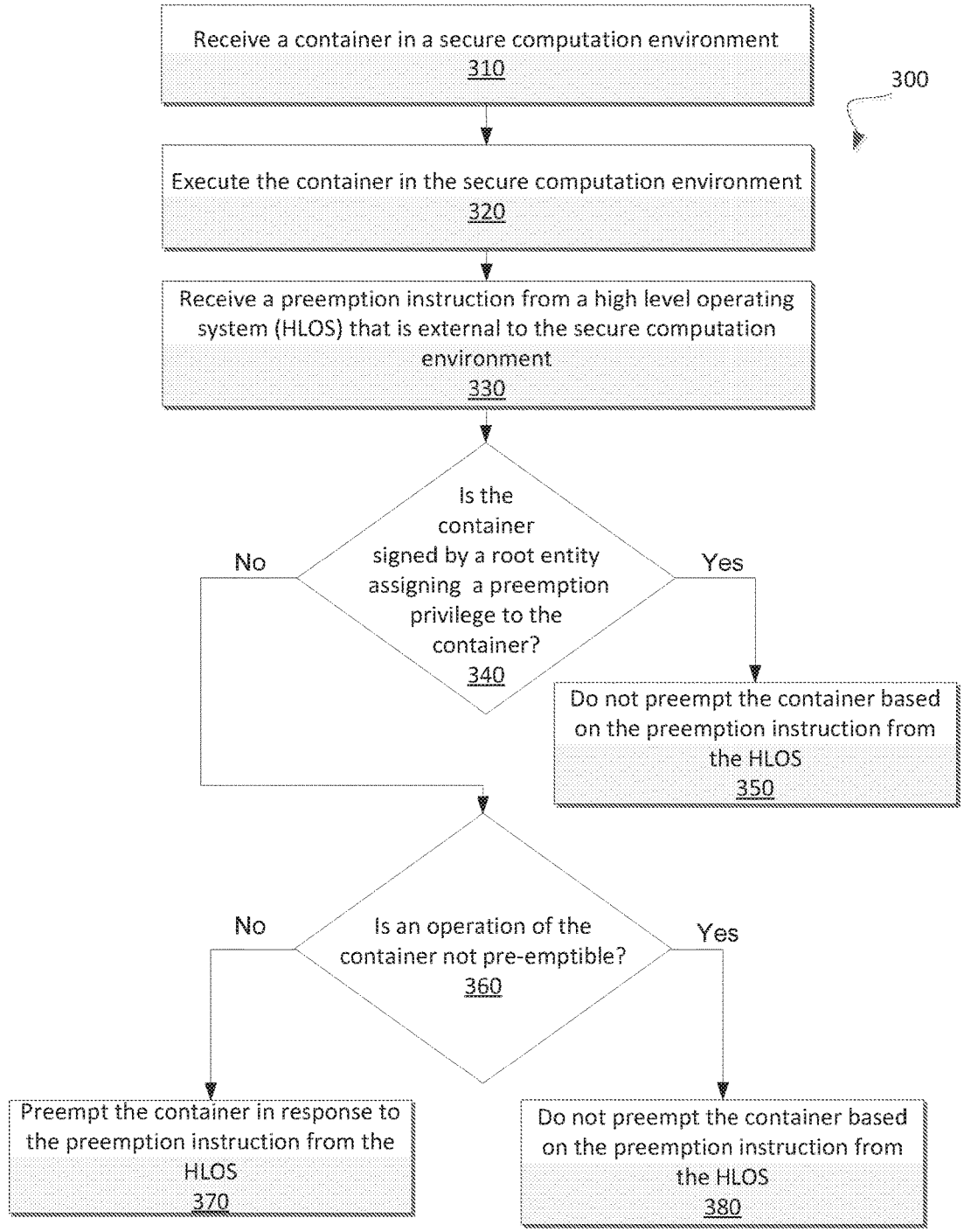
FIG. 3 is a flow diagram of an example method to preempt containers in a secure computation environment in accordance with some embodiments of the present disclosure.

FIG. 3 is a flow diagram of an example method 300 to preempt containers in a secure computation environment. In general, the method 300 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the preemption manager 125 or 255 of FIG. 1 or 2.

As shown in FIG. 3, the method 300 may begin with the processing logic receiving a container in a secure computation environment (block 310). For example, an HLOS may schedule the container to be executed by a secure computation environment that corresponds to hardware resources or components. The processing logic may subsequently execute the container in the secure computation environment (block 320). For example, one or more operations of the container may be performed by hardware resources or components (e.g., a processing device or CPU) of the secure computation environment. Furthermore, the processing logic may receive a preemption instruction from a high level operating system (HLOS) that is external to the secure computation environment (block 330). The secure computation environment may include an HLOS register that is used to facilitate communication between a container that is being executed by the secure computation environment and the HLOS of a device or system that includes the secure computation environment. For example, the HLOS may store the preemption instruction in the HLOS register and the secure computation environment may retrieve the preemption instruction from the HLOS register.

The processing logic may determine whether the container is signed by a root entity that has assigned a preemption privilege to the container (block 340). In some embodiments, the container may be cryptographically signed by a root entity. For example, a root entity may sign the container with a private key and the secure computation environment may verify the signature of the container with a public key that corresponds to the private key. In some embodiments, the public key may be stored in the hardware resources or components (e.g., a memory) of the secure computation environment. The container may include or be associated with information that identifies the preemption privilege. If the signature is verified by the public key, then the secure computation environment may recognize the preemption privilege that has been assigned to the container. However, if the signature is not verified by the public key, then the secure computation environment may not recognize the preemption privilege that has been assigned to the container. If the container has been signed by a root entity that has assigned a preemption privilege to the container, then the processing logic may not preempt or terminate the container based on the preemption instruction from the HLOS (block 350). For example, the preemption instruction from the HLOS may not be used to preempt or terminate the container. In some embodiments, the container may be preempted or terminated based on a watchdog timer and/or the preemption privilege. For example, the watchdog timer may specify a number of processor or CPU cycles (or other such time increment or value) of the secure computation environment that may be used to execute the container. The preemption privilege may specify a number of additional processor cycles to add to the start or initial value of the watchdog timer. In the same or alternative embodiments, the preemption privilege may specify the start time or the initial value of the watchdog timer for the container that is currently being executed. In another embodiment, the preemption privilege may specify that the container is not to be terminated or preempted until a hardware enforced time limit or maximum number of processor cycles has been reached during the execution of the container.

If the container is not signed by a root entity that has assigned a preemption privilege to the container, the processing logic may further determine whether an operation of the container is not pre-emptible (block 360). In some embodiments, an operation that is not pre-emptible may correspond to a modifying of a memory or other such hardware resource or component of a secure computation environment or a system that includes the secure computation environment. For example, an operation that writes to OTP memory may not be pre-emptible. The container may include multiple operations that are to be performed during the execution of the container by the secure computation environment. In some embodiments, a currently executed operation of the container may be identified as being either pre-emptible or not pre-emptible. If the operation is not pre-emptible, then the processing logic may preempt the container in response to the HLOS preemption instruction (block 370). For example, the container may no longer be executed by the hardware resources or components of the secure computation environment and a subsequent container may be received and executed by the hardware resources or components of the secure computation environment. If the operation of the container is not pre-emptible, then the processing logic may not preempt the container based on the preemption instruction from the HLOS. For example, the operation of the container may be completed by the secure computation environment.

In some embodiments, the container may include multiple operations and the processing logic may allow a non pre-emptible operation to be completed before preempting or terminating the container. For example, the container may include a first operation and a second operation. The first operation may not be pre-emptible (e.g., the first operation performs a modification to OTP memory). In response to receiving a preemption instruction from the HLOS while the secure computation environment is performing the first operation, the container may be preempted or terminated after allowing the first operation to be completed by the secure computation environment. As such, the other operations (e.g., the second operation) of the container may not be executed by the secure computation environment after receiving the preemption instruction from the HLOS.

Figure 4:
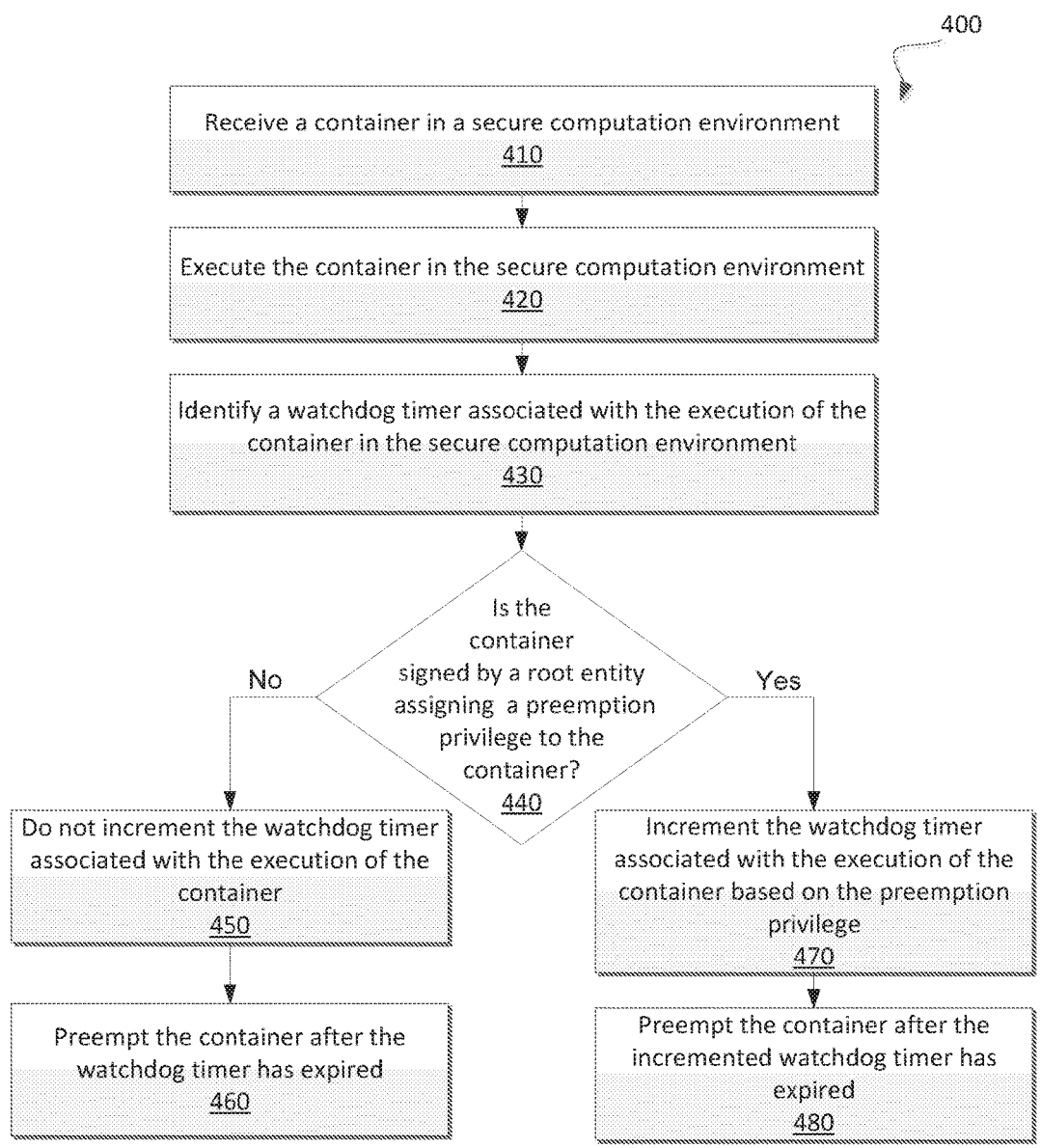
FIG. 4 is a flow diagram of another example method to preempt containers in a secure computation environment in accordance with some embodiments.

FIG. 4 is a flow diagram of another example method 400 to preempt containers. In general, the method 400 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the preemption manager 125 or 255 of FIG. 1 or 2.

As shown in FIG. 4, the method 400 may begin with the processing logic receiving a container in a secure computation environment (block 410) and executing the container in the secure computation environment (block 420). Subsequently, the processing logic may identify a watchdog timer associated with the execution of the container in the secure computation environment (block 430). For example, the watchdog time may specify a particular start value or initial value for a timer and may be decremented by a value for each processing cycle performed by the secure computation environment. In the same or alternative embodiments, each container that is received by a secure computation environment may be associated with a watchdog timer with a default start value. Thus, each container of multiple containers received by the secure computation environment may be associated with a same start value for the watchdog timer. Thus, the watchdog timer may specify an amount of time or a number of processing cycles that a container may be executed by the secure computation environment.

The processing logic may further determine whether the container is signed by a root entity that has assigned a preemption privilege to the container (block 440). In some embodiments, the preemption privilege of the container may correspond to an identification of an additional value or number of processing cycles to add to the initial value or start value of the watchdog timer for the container. If the container is not signed by the root entity, then the processing logic may not increment the watchdog timer associated with the execution of the container (block 460). For example, the amount of time or number of processing cycles of the secure computation environment that may be used to execute the container before the container is terminated or preempted may not be changed from the start value or the initial value of the watchdog timer. The processing logic may thus preempt or terminate the container after the watchdog timer has expired (block 460). However, if the processing logic determines that the container is signed by a root entity that has assigned a preemption privilege to the container, then the processing logic may increment the watchdog timer associated with the execution of the container based on the preemption privilege (block 470). For example, the preemption privilege may specify an amount of time or a number of processing cycles of a processing device of the secure computation environment that may be added to the initial value or the start value of the watchdog timer. The processing logic may subsequently preempt or terminate the container after the incremented watchdog timer has expired (block 480).

As an example, the watchdog timer may start at a default value of a million processing cycles. If the watchdog timer is not incremented, then a container may be terminated or preempted after the secure computation environment has executed the container for one million processing cycles. However, if the watchdog timer has been incremented by a value of two million processing cycles, then the container may be terminated or preempted after the secure computation environment has executed the container for three million processing cycles.

Figure 5:
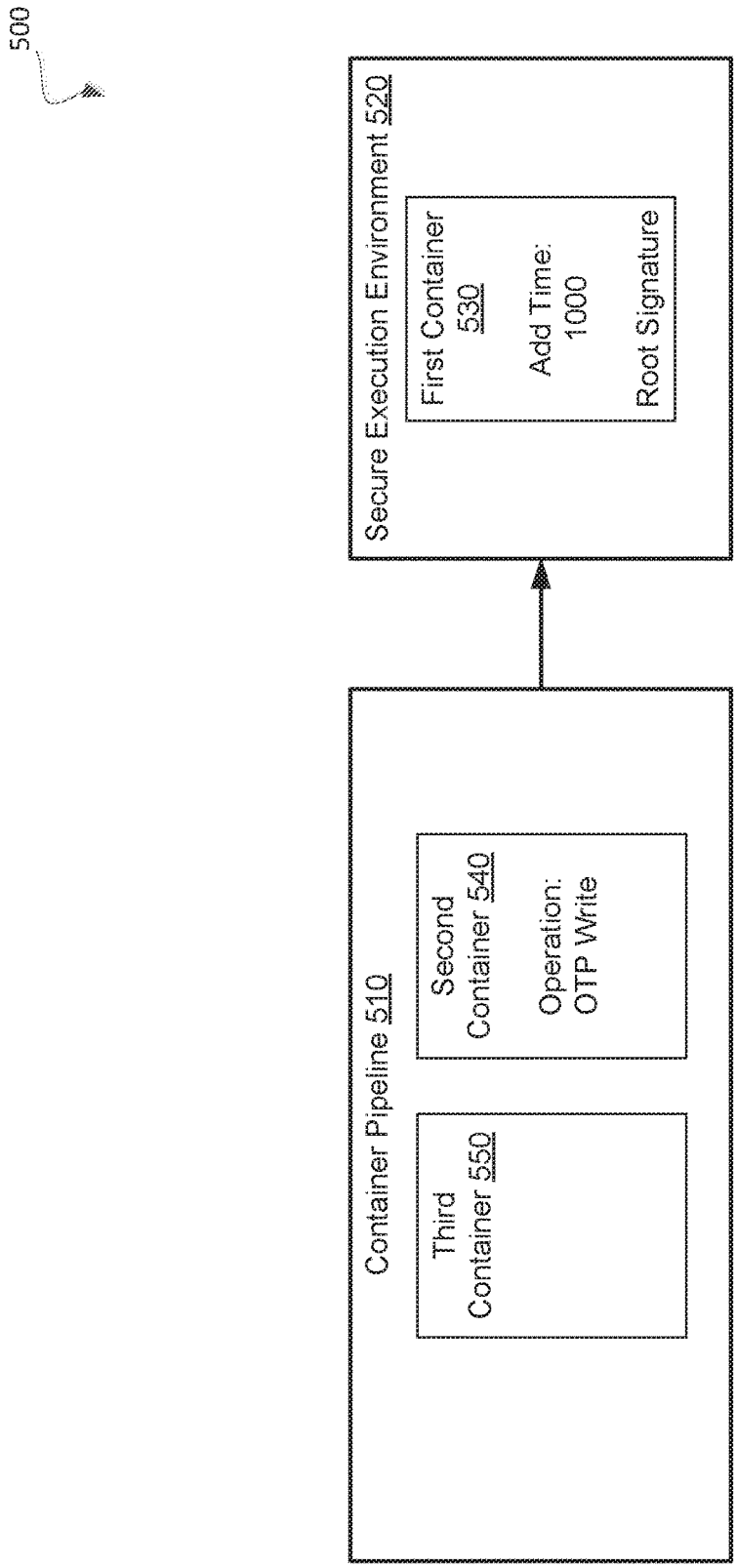
FIG. 5 illustrates a block diagram of containers being received by a secure computation environment in accordance with some embodiments of the present disclosure.

FIG. 5 illustrates a block diagram of containers being received by a secure computation environment 520. In general, the secure computation environment 520 may correspond to the secure computation environment 120 or 200 of FIG. 1 or 2.

As shown in FIG. 5, the secure computation environment 520 may receive containers from a container pipeline 510. For example, an HLOS may schedule a series of containers to be queued in the container pipeline 510 to be received and executed by the secure computation environment 520. A first container 530 may be received by the secure execution environment 520. Furthermore, the first container 530 may be signed by a root entity (e.g., via the root signature) and may be assigned a preemption privilege that adds a period of time (or a number of processing cycles) to the watchdog timer that is used by the secure computation environment 520 when executing the first container 530. Thus, the first container 530 may include information to add time or processing cycles to a watchdog timer. A second container 540 may include an operation that corresponds to the writing of data to an OTP memory. When the secure computation environment 520 receives the second container 540, the preemption or terminating of the second container 540 may not be allowed until the OTP write operation of the second container 540 has been completed. Furthermore, a third container 550 may not be signed by a root entity and may not include an operation that is not pre-emptible. As such, the third container 550 may be preempted or terminated by a preemption instruction from an HLOS.

Figure 6:
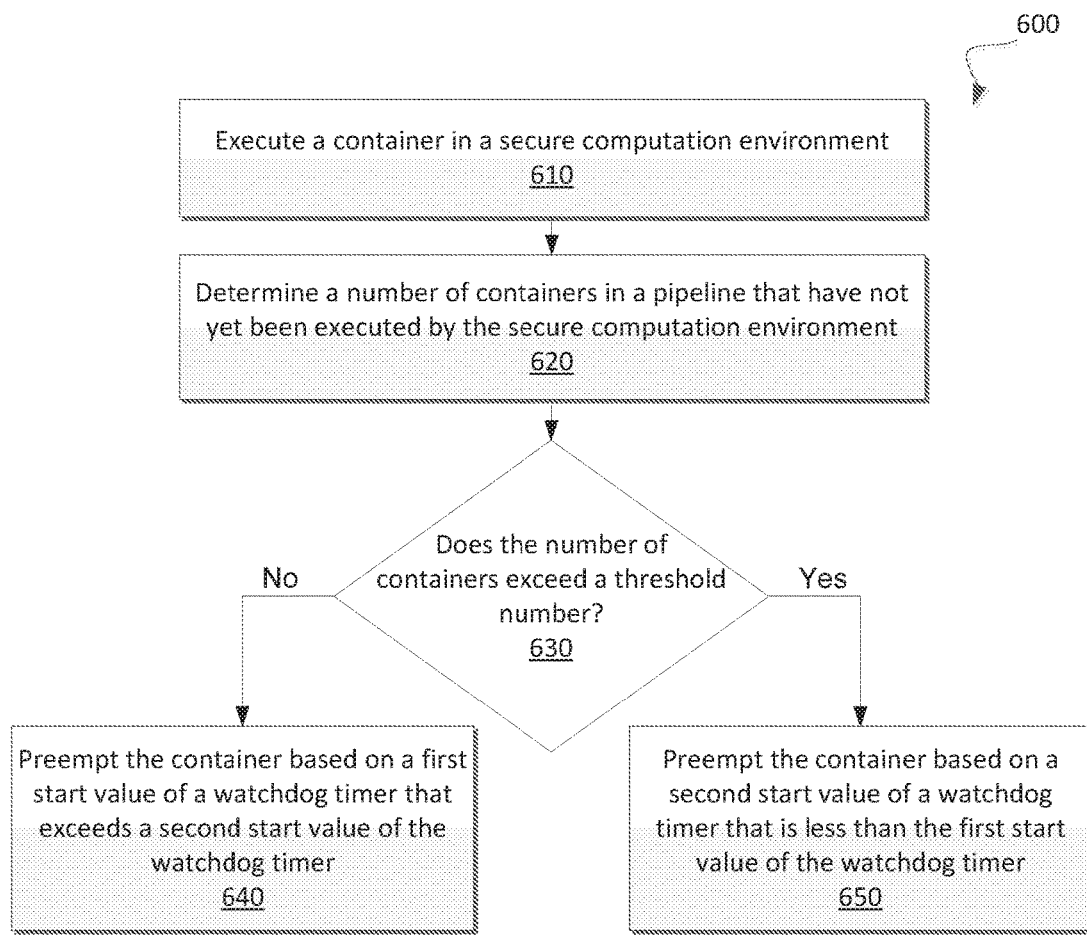
FIG. 6 is a flow diagram of an example method to preempt a container based on different timers in accordance with some embodiments of the present disclosure.

FIG. 6 is a flow diagram of an example method 600 to preempt a container based on different timers. In general, the method 600 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 may be performed by the preemption manager 125 or 255 of FIG. 1 or 2.

As shown in FIG. 6, the method 600 may begin with the processing logic executing a container in a secure computation environment (block 610). The processing logic may further determine a number of containers in a container pipeline that have not yet been executed by the secure computation environment (block 620). For example, a number of containers that have been scheduled by the HLOS to be executed by the secure computation environment may be identified. The processing logic may subsequently determine whether the number of containers in the container pipeline exceeds a threshold number of containers (block 630). If the number of containers in the container pipeline does not exceed the threshold number, then the processing logic may preempt or terminate the container based on a first start value of a watchdog timer that exceeds a second start value of the watchdog timer (block 640). However, if the number of containers exceeds the threshold number, then the processing logic may preempt or terminate the container based on the second start value of the watchdog timer that does not exceed or is less than the first start value (block 650).

As such, a first start value for the watchdog timer may be used when fewer than a threshold number of containers have been scheduled to be executed by the secure computation environment and have not yet been executed and a second start value that is less than the first start value may be used when a number of containers that have been scheduled and not yet executed is equal to or exceeds the threshold number. As such, when more containers are scheduled to be executed by the secure computation environment, then the start value of the watchdog timer for each of the containers may be less than when fewer containers are scheduled to be executed by the secure computation environment.

Figure 7:
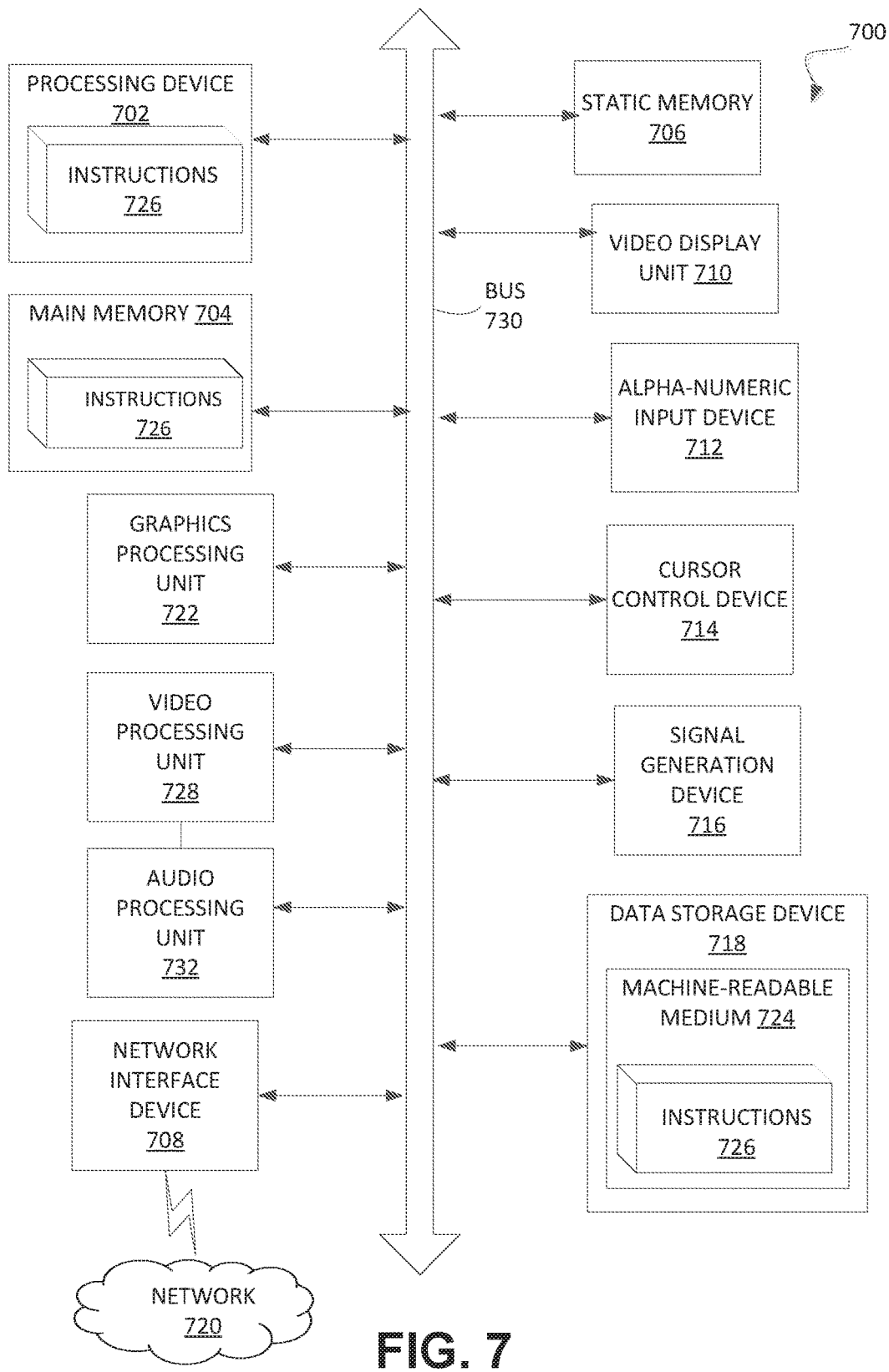
FIG. 7 illustrates a block diagram of an embodiment of a computer system in which some embodiments of the disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to a preemption manager (e.g., preemption manager 125 or 255 of FIG. 1 or 2). While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   receiving a container corresponding to executable code;
   executing the container in a secure computation environment by performing one or more operations specified by the executable code of the container;
   receiving, from a high level operating system (HLOS) that is external to the secure computation environment, an instruction to terminate the executing of the container;
   determining whether the container is associated with a preemption privilege by verifying a cryptographic signature of the container during execution of the container; and
   terminating, by a processing device, the executing of the container after receiving the instruction from the HLOS based on the determination of whether the container is associated with the preemption privilege.

2. The method of claim 1, wherein the terminating of the executing of the container based on whether the container is associated with the preemption privilege comprises:
   ignoring the instruction from the HLOS in response to determining that the container is associated with the preemption privilege; and
   terminating the container based on a timer value that is associated with the preemption privilege.

3. The method of claim 2, wherein the timer value that is associated with the preemption privilege is different than a default timer value of the secure computation environment for another container that is not associated with any preemption privilege.

4. The method of claim 1, further comprising:
   determining whether an operation of the one or more operations specified by the executable code of the container that is currently being performed corresponds to a modification of a resource associated with the secure computation environment,
   wherein the terminating of the executing of the container is further based on the determination of whether the operation that is currently being performed corresponds to the modification of the resource so that the terminating of the execution of the container is performed after a completion of the operation that corresponds to the modification of the resource.

5. The method of claim 4, wherein the modification of the resource is a write operation to one-time programmable (OTP) memory.

6. The method of claim 1, wherein determining whether the container is associated with the preemption privilege comprises:
   verifying that the cryptographic signature is from a root entity that is associated with the container; and
   in response to verifying the cryptographic signature, adding an amount of time specified by the preemption privilege to a watchdog timer that is associated with the secure computation environment.

7. The method of claim 6, wherein the watchdog timer corresponds to a maximum amount of time for the secure computation environment to execute the container.

8. A system comprising:
   a memory; and
   a processing device operatively coupled with the memory to:
      receive a container corresponding to executable code;
      execute the container in a secure computation environment by performing one or more operations specified by the executable code of the container;
      receive, from a high level operating system (HLOS) that is external to the secure computation environment, an instruction to terminate the executing of the container;
      determine whether the container is associated with a preemption privilege by verifying a cryptographic signature of the container during execution of the container; and
      terminate the executing of the container after receiving the instruction from the HLOS based on the determination of whether the container is associated with the preemption privilege.

9. The system of claim 8, wherein to terminate the executing of the container based on whether the container is associated with the preemption privilege comprises, the processing device is further to:

ignore the instruction from the HLOS in response to determining that the container is associated with the preemption privilege; and terminate the container based on a timer value that is associated with the preemption privilege.

10. The system of claim 9, wherein the timer value that is associated with the preemption privilege is different than a default timer value of the secure computation environment for another container that is not associated with any preemption privilege.

11. The system of claim 8, wherein the processing device is further to:

determine whether an operation of the one or more operations specified by the executable code of the container that is currently being performed corresponds to a modification of a resource associated with the secure computation environment, wherein the terminating of the executing of the container is further based on the determination of whether the operation that is currently being performed corresponds to the modification of the resource so that the terminating of the execution of the container is performed after a completion of the operation that corresponds to the modification of the resource.

12. The system of claim 11, wherein the modification of the resource is a write operation to one-time programmable (OTP) memory.

13. The system of claim 8, wherein to determine whether the container is associated with the preemption privilege, the processing device is further to:

verify that the cryptographic signature is from a root entity that is associated with the container; and in response to verifying the cryptographic signature, add an amount of time specified by the preemption privilege to a watchdog timer that is associated with the secure computation environment.

14. The system of claim 13, wherein the watchdog timer corresponds to a maximum number of processing cycles of the secure computation environment that are used to execute the container.

15. A non-transitory computer readable medium comprising instructions that, when executed by a processing device, cause the processing device to perform operations comprising:

receiving a container corresponding to executable code;

executing the container in a secure computation environment by performing one or more operations specified by the executable code of the container;

receiving, from a high level operating system (HLOS) that is external to the secure computation environment, an instruction to terminate the executing of the container;

determining whether the container is associated with a preemption privilege by verifying a cryptographic signature of the container during execution of the container; and terminating, by a processing device, the executing of the container after receiving the instruction from the HLOS based on the determination of whether the container is associated with the preemption privilege.

16. The non-transitory computer readable medium of claim 15, wherein to terminate the executing of the container based on whether the container is associated with the preemption privilege, the operations further comprise:

ignoring the instruction from the HLOS in response to determining that the container is associated with the preemption privilege; and terminating the container based on a timer value that is associated with the preemption privilege.

17. The non-transitory computer readable medium of claim 16, wherein the timer value that is associated with the preemption privilege is different than a default timer value of the secure computation environment for another container that is not associated with any preemption privilege.

18. The non-transitory computer readable medium of claim 15, the operations further comprising:

determining whether an operation of the one or more operations specified by the executable code of the container that is currently being performed corresponds to a modification of a resource associated with the secure computation environment, wherein the terminating of the executing of the container is further based on the determination of whether the operation that is currently being performed corresponds to the modification of the resource so that the terminating of the execution of the container is performed after a completion of the operation that corresponds to the modification of the resource.

19. The non-transitory computer readable medium of claim 15, wherein to determine whether the container is associated with the preemption privilege, the operations further comprise:

verifying that the cryptographic signature is from a root entity that is associated with the container; and in response to verifying the cryptographic signature, adding an amount of time specified by the preemption privilege to a watchdog timer that is associated with the secure computation environment.

20. The non-transitory computer readable medium of claim 19, wherein the watchdog timer corresponds to a maximum amount of time for the secure computation environment to execute the container.

* * * * *